United States Patent [19]

Skelly et al.

[11] Patent Number: 5,702,772
[45] Date of Patent: Dec. 30, 1997

[54] METHOD FOR IDENTIFYING AND PROTECTING AN ACTIVATED PLASTIC SURFACE

[75] Inventors: Jon M. Skelly, Ypsilanti; Lawrence F. Wilski, Warren, both of Mich.

[73] Assignee: Ford Motor Company, Dearborn, Mich.

[21] Appl. No.: 794,980

[22] Filed: Feb. 5, 1997

Related U.S. Application Data

[62] Division of Ser. No. 565,196, Oct. 6, 1995, abandoned.

[51] Int. Cl.⁶ .................................................. H05H 1/00
[52] U.S. Cl. ........................ 427/536; 427/155; 427/322; 427/353; 427/384; 427/569
[58] Field of Search .................... 427/536, 569, 427/322, 384, 353, 155

*Primary Examiner*—Bernard Pianalto
*Attorney, Agent, or Firm*—Damian Porcari

[57] ABSTRACT

A method for identifying and protecting activated surface portions of a plastic substrate is provided. The method includes the steps of providing a plastic substrate having one or more activated surface portions and applying a solution containing a water-soluble, organic film-forming substance onto the substrate. The solution coats only the activated portions of the substrate surface. The method further includes the steps of drying the solution to form a temporary protective film on the activated portions of the surface, thereby rendering the activated portions less susceptible to abrasion or disruption during handling.

4 Claims, No Drawings

METHOD FOR IDENTIFYING AND PROTECTING AN ACTIVATED PLASTIC SURFACE

This is a divisional of application Ser. No. 08/565,196 filed Oct. 6, 1995, abandoned.

BACKGROUND OF THE INVENTION

1. Field of the Invention

The present invention relates to a method for selectively coating activated surface portions of a plastic substrate with a temporary protective film.

2. Description of Related Art

As used herein, an activated plastic surface is a surface of a plastic substrate that has been modified to include chemical functional groups which improve the adhesion properties of the plastic substrate. An activated plastic surface has a higher free energy than a corresponding untreated or unactivated plastic surface.

The benefits of activating the surfaces of plastic substrates are well known, and various surface activation methods, such as plasma treatment, ozone treatment, flame treatment, fluorination treatment, sulfonation treatment, and electrical discharge treatment (e.g., corona treatment) are taught in the prior art. These activation methods generally alter the surface chemistry of the plastic substrate such that it contains polar functional groups. The polar functional groups render the substrate more receptive to paints, adhesives, foams and the like.

A problem with many activated surfaces, however, is that they can be easily abraded or disrupted by normal handling and shipping. Treated plastic parts exhibit poor adhesion properties in areas where the activated surface is disrupted. Therefore, to preserve the activated surface prior to painting or other post-activation processing, some manufacturers have designed carrying systems for the treated parts in which manual handling of the parts is avoided. These systems add to the cost and complexity of the overall manufacturing process. In addition, they do not enable the parts to be shipped to other facilities for subsequent processing; any painting or other post-activation processing must be carried out in the same manufacturing facility as the activation step. Given these drawbacks of the prior art, it would be desirable to provide a simple, low-cost method for temporarily protecting the activated surface portions of plastic substrates from damage during shipping and handling.

Methods for temporarily protecting unactivated plastic substrates from soiling are known. One such method, disclosed in U.S. Pat. No. 5,418,006, includes applying a temporary coating to an unactivated surface of a plastic substrate prior to exposing the substrate to contaminants. Following exposure of the substrate to contaminants, the temporary coating is removed, leaving a clean substrate surface. In order for the temporary coating to wet out on the unactivated surface of the plastic substrate, it must contain a significant amount of a wetting or dispersing agent. Such a coating would not generally be useful for temporarily protecting an activated substrate surface since wetting/dispersing agents tend to be difficult to remove from activated surfaces. Residues left on an activated surface can interfere with subsequent processing of the substrate. Moreover, coatings containing significant amounts of wetting/dispersing agents are undesirable for use with the present invention since it is an object of the invention to provide a method for readily distinguishing between activated and unactivated portions of substrate surfaces. A coating containing a significant amount of a wetting/dispersing agent would wet out on unactivated portions as well as activated portions of a substrate surface.

SUMMARY OF THE INVENTION

The present invention provides a method for identifying and protecting activated surface portions of a plastic substrate with a temporary protective film. The method includes the steps of providing a plastic substrate having one or more activated surface portions and applying a solution containing a water-soluble, organic film-forming substance onto the substrate. The solution readily coats only the activated portions of the substrate surface. The method further includes the steps of drying the solution to form a temporary protective film on the activated portions of the surface, thereby rendering the activated portions less susceptible to abrasion or disruption during handling. According to one aspect of the present invention, the method also includes the steps of removing the temporary protective film, and painting the re-exposed activated portions of the substrate surface.

The present invention also provides an article comprising a plastic substrate having an activated surface with polar functional groups. A temporary protective film is provided on the activated surface. The film contains a water-soluble, organic film-forming substance.

The present invention enables a plastic substrate to be handled prior to subsequent processing without disrupting an activated surface layer provided thereon. Another advantage of the present invention is that the same film used to protect the activated substrate surface can also be used to identify whether the substrate surface has been properly activated.

These and other features and advantages of the present invention will be more fully described with reference to the following detailed description.

DETAILED DESCRIPTION OF THE PREFERRED EMBODIMENTS

As indicated above, the present invention teaches a method for protecting activated surface portions of a plastic substrate. The surface of the substrate may be activated by any known surface activation method. One preferred surface activation method is plasma treatment. Various plasma treatment methods are described in detail in Nicholas C. Morosoff, *Introduction, in Plasma Deposition, Treatment and Etching of Polymers* 1–93, Ricardo d'Agostino ed., 1990, and U.S. Pat. No. 5,415,819, entitled "Low Pressure Plasma Treatment Method", which are incorporated herein by reference. In general, plasma treatment consists of exposing the plastic substrate to a partially ionized gas or plasma. The plasma is produced by the interaction of a suitable ionizable gas with an electric field. The plasma is composed of ions, radicals, neutral species, and highly energetic electrons. The active species react with the polymer to create polar functional groups on its surface. The types of polar functional groups formed on the substrate surface is dependent on the ionizable gas selected. For example, if an oxygen-containing gas is used, oxygen-containing functional groups, such as hydroxyl and carbonyl groups will be formed, whereas if a nitrogen-containing gas is used, nitrogen-containing functional groups, such as amine groups, will be formed. Following the activation treatment, the substrate surface will preferably contain at least about 10% more polar functional groups than before the treatment. The polar or activated surface thus produced has a high affinity for coating materials such as paints, adhesives, and foams. However, as noted above, the activated surface is easily disrupted by manual handling normally associated with transporting parts from one treatment station to another. If the activated surface is disrupted, coating materials such as those listed above will not adhere to the substrate. A similar problem occurs if portions of the substrate surface are not adequately treated during the surface activation process.

For these reasons, it is desirable to coat the activated surface with a temporary protective film following the surface activation process. According to the present invention, this film does not contain a significant amount of any surfactant or other wetting/dispersing agent so that it only coats those portions of the substrate surface that are activated. A simple visual inspection can thus reveal whether the surface activation process was successful in treating the proper areas of the substrate. If desired, a small amount of fluorescent dye may be added to the film to facilitate inspection.

Plastic substrates commonly subjected to plasma treatment and other surface modification methods to improve their adhesion properties include, but are not limited to, polyethylene, polypropylene, polystyrene, nylon, polycarbonate, rubber, fluorinated and chlorinated polymers, and thermoplastic olefins (TPO's).

To form a temporary protective film according to the present invention, a solution containing a water-soluble, organic film-forming substance is first applied to the activated surface of a plastic substrate. The solution is preferably an aqueous solution containing from about 3% to about 20% by weight of the film-forming substance. When using less concentrated solutions, more than one application of the solution may be required to achieve the desired film thickness. The application step preferably comprises spraying the solution onto the substrate, though the application step could alternatively comprise dipping the substrate into the solution. Brushing and wiping are less desirable methods of applying the solution, since the activated surface could be abraded in the process. The solution preferably has a sufficiently low viscosity to allow it to be sprayed by conventional techniques.

The film-forming substance may be any natural or synthetic organic material that contains polar functional groups, and is capable of forming a continuous, flexible (nonbrittle) solid film on activated portions of the substrate surface. Preferred synthetic film-forming substances include water-soluble polymers such as polyvinyl alcohol, polyvinylpyrrolidone, polyethylene glycol, and derivatives thereof, including copolymers. A particularly preferred film-forming synthetic polymer is a 70/30 copolymer of vinylpyrrolidone and vinyl acetate commercially available from International Specialty Products of Bound Brook, N.J., as PVP/VA W-735 (see Example 1, solution A). Other preferred film-forming substances include saccharides. Suitable saccharides can range from relatively low molecular weight mono-, di-, and oligo-saccharides, such as glucose, dextrin, and maltodextrin, to relatively high molecular weight polysaccharides, such as starch and cellulose. Preferred film-forming saccharides are described in greater detail in Example 1 below.

As previously indicated, the solution must not contain components such as wetting or dispersing agents in amounts sufficient to cause the solution to significantly wet out on unactivated portions of the substrate surface if the film is to be used to identify whether the substrate surface is properly activated. In addition, the solution should not contain any components which might leave a residue on the activated surface and interfere with subsequent processing of the substrate. Any components that would make removal of the film more difficult (e.g., water-repellents) should also be avoided.

After the solution containing the film-forming substance is applied to the substrate surface, the solution is allowed to dry, forming a solid protective film on the activated portions of the substrate surface. In a preferred embodiment of the invention, the substrate is placed in a dryer to speed the evaporation of the solvent from the solution. The dry protective film protects the underlying activated surface portions from being abraded or disrupted during handling and shipping. For automotive applications, film thicknesses ranging from about 0.1–1.0 mil are desirable, and film thicknesses of from about 0.1 mil to about 0.2 mil are preferred.

The protective film formed on the activated surface contains polar functional groups which interact with the polar functional groups of the activated surface. These interactions, in the form of dipole-dipole interactions and hydrogen bonding, are believed by the inventors to prevent the polar functional groups of the activated surface from internalizing via rotation as described in U.S. Pat. No. 5,415,819. Thus, it is believed that by forming the protective film on the activated substrate surface soon after the activation step, the activated portions of the substrate surface may be maintained in a high surface energy state for an extended period of time. Neither the accuracy of this theory nor its understanding is, however, necessary for the practice of this invention.

Removal of the temporary protective film re-exposes the activated surface portions of the substrate. Since the film-forming substance is water-soluble, the film may be removed from the plastic part by, for example, immersing the part in water or subjecting the coated surface of the part to a stream of water. This water may contain suitable acids, bases, detergents and other additives that aid in the removal of the film. In automotive applications where the part is to be painted after removal of the film, the film may be conveniently removed in the same water wash process used to clean the part for painting. One such typical water wash process for automotive fascias includes two washing stages and four rinsing stages. In the first washing stage, the parts are sprayed with tap water having a pressure of about 20–22 psi, a temperature of about 95°–100° F., and a flow rate of approximately 470 gallons per minute. The dwell time for each part is approximately 22 seconds. In the second wash stage, the parts are sprayed with an aqueous cleaning solution, such as Plastaprep 1 commercially available from Oakite Canada Ltd. of Bramalea, Ontario, Canada. The cleaning solution is sprayed at a pressure of about 20–22 psi, a temperature of about 135°–145° F., and a flow rate of about 1420 gallons per minute. The dwell time for each part is approximately 55 seconds. In the four rinsing stages, deionized water, tap water and aqueous acid solutions are used to rinse off the cleaning solution applied in the second wash stage. The protective film of the present invention is preferably completely removed in the first two stages of the water wash process, and is more preferably completely removed in the first washing stage.

After removal of the temporary protective film, coating materials such as paints, adhesives and foams may be applied to the activated substrate surface in conventional fashion.

The invention will be further understood by referring to the following examples. It should be understood that the subject examples are presented by way of illustration and not by way of limitation. Unless otherwise indicated, the plastic substrate referenced in the examples is a rubber-modified, polypropylene-based TPO available from D&S Plastics of Auburn Hills, Mich., as D161B TPO. References to Solutions A–D in the examples refer to preferred embodiments of the film-forming solutions of the present invention, which are characterized as follows:

Solution A

The film-forming substance in Solution A is PVP/VA W-735, a 70/30 copolymer of polyvinylpyrrolidone and vinyl acetate supplied by International Specialty Products as an aqueous solution having a solids content of 48–52% by weight and a density of about 69.6 lbs/ft$^3$. The product literature indicates that gluteraldehyde is added as a stabilizer in an amount of 0.15% by weight. Solution A is prepared by mixing approximately 5 gallons of the PVP/VA W-375 solution in 50 gallons of water to form a 10 wt % solution. The viscosity of Solution A is approximately 17.6 cps at 72° F.

Solution B

The film-forming substance in Solution B is Dextrin 8011, a commercial food grade corn dextrin available from Casco in Etobicoke, Ontario, Canada, or CornProducts in Summit-Argo, Ill. Dextrin 8011 has a bulk density of 37 lbs/ft$^3$. In a typical preparation of Solution B, 22 lbs of Dextrin 8011 is added to 50 gallons of water and mixed until sufficiently dissolved (approximately 10 minutes) to form a 5.0 wt % solution. Preferably, the water should be warm (105° F.) to allow the Dextrin 8011 to more readily dissolve. The viscosity of Solution B is approximately 9.67 cps at 68° F.

Solution C

The film-forming substance in Solution C is Maltodextrin 1910, a commercial food grade enzyme-converted maltodextrin available from Casco in Etobicoke, Ontario, Canada, or CornProducts in Summit-Argo, Ill. Maltodextrin 1910 has a bulk density of 28–38 lbs/ft$^3$. A typical carbohydrate profile of Maltodextrin 1910 includes 8% tetrasaccharides and lower, 92% higher saccharides, and a Dextrose Equivalent of 8.0–12.0. In a typical preparation of Solution C, 55 lbs of Maltodextrin 1910 is added to 50 gallons of water and mixed until sufficiently dissolved (approximately 10 minutes) to form a 15.5 wt % solution. The viscosity of Solution C is approximately 16.2 cps at 68° F.

Solution D

The film-forming substance in Solution D is "LO-DEX 10", a commercial food grade enzyme-converted maltodextrin available from American Maize-Products Company of Hammond, Ind. "LO-DEX 10" has a bulk density of 31 lbs/ft$^3$. A typical carbohydrate profile of "LO-DEX 10" includes 6% trisaccharides and lower, 94% tetrasaccharides and higher, and a Dextrose Equivalent of 11.0. In a typical preparation of Solution D, 57 lbs of "LO-DEX 10" is added to 50 gallons of water and mixed until sufficiently dissolved (approximately 10 minutes) to form a 12.0 wt % solution. The viscosity of Solution D is approximately 15.6 cps at 72° F.

EXAMPLE 1

Part A of this example illustrates the use of the present invention for protecting activated substrate surfaces from damage during handling.

A. Automotive fascias made of TPO were plasma treated using zero grade air according to known techniques to provide uniform activated surfaces thereon. Solution B, prepared in the manner described above, was sprayed onto the plasma-activated surfaces of the fascias with nozzles positioned between 2 and 5 inches from the fascia surfaces. The nozzle pressure was approximately 35–40 psi. The solutions were dried in a dehumidifier/dryer unit for 6 minutes at temperatures ranging from 95°–120° F. and a relative humidity ranging from 20–30%. Solid, continuous protective films having thicknesses between about 0.1 and 0.2 mil were thus formed on the fascia surfaces. The fascias were then handled by operators who manually removed the fascias from the dehumidifier/dryer unit and placed them on racks for painting. The fascias were later subjected to the water wash process described above to remove the protective films. After drying the re-exposed surfaces, the fascias were painted using a two component acrylic/polyester urethane crosslinked basecoat/clearcoat paint system. The paint system was cured by baking at 250° F. for approximately one hour. The painted fascias were tested for paint adhesion no sooner than 72 hours after baking in order to permit complete crosslinking of the paint. The adhesion testing comprised a crosshatch and tape pull test commonly used in the automotive industry. All areas of the fascias that had been coated with the temporary protective film exhibited excellent paint adhesion.

B. A comparative experiment, not according to the present invention, was conducted in which painted TPO fascias were generally manufactured as described above except that the plasma-activated surfaces of the fascias were not provided with temporary protective films. After the plasma treatment step, operators manually removed the fascias from the plasma treatment chamber and placed them on racks for painting. The water wash system described above was used to prepare the fascias for painting. After drying the surfaces of the fascias, the fascias were painted, cured and tested in the same manner described in part A above. All of the fascias exhibited paint delamination in the areas in which they were handled, but not in other areas.

EXAMPLE 2

The experiment of Example 1, Part A is repeated using Solutions A, C and D as the film-forming solutions. Similar excellent adhesion results are expected.

EXAMPLE 3

Three TPO sample plaques were provided for x-ray photoelectron spectroscopy (XPS) analysis. Sample 1 was left untreated, while Samples 2 and 3 were each treated with an air plasma in a small vacuum chamber for 10 seconds. The air was introduced into the chamber at a flow rate of 250 SCCM, and a radio frequency (13.56 MHz) generator was operated at 60 W to ignite the plasma. Following the plasma treatment, film-forming Solution B was sprayed onto the plasma-activated surface of Sample 3 and allowed to dry, forming a temporary protective film thereon.

XPS spectra of Samples 1–3 were obtained on a Surface Science Laboratories SSX-100 photoelectron spectrometer with a monochromatized Al K$_\alpha$ photon source. An electron take-off angle of 37° relative to each surface was used. High resolution scans for carbon ($C_{1s}$) were obtained using a 300 μm x-ray spot size and a pass energy of 100 eV. Sample charging was controlled using a flood gun/screen technique. Specimens from Samples 1–3 were cut from the middle of the plaques and care was taken not to touch any of the plasma treated surfaces.

Samples 1–3, prepared in the manner described above, were analyzed and these high resolution carbon scan results are provided in the following table as "unwashed" data. As the data indicate, the surface of untreated Sample 1 contained no polar functional groups, while the surfaces of Samples 2 and 3 each contained hydroxyl and carbonyl groups. The presence of the dextrin-containing protective film on Sample 3 was evident from the high percentage of hydroxyl functional groups found on Sample 3 (45.3%) vs. on Sample 2 (8.8%).

Samples 2 and 3 were analyzed again after being washed with tepid tap water for approximately 5 minutes and allowed to air dry. The scan results are provided in the table as "washed" data and show that the washing removed the protective film from Sample 3, re-exposing the plasma-activated substrate surface. As indicated below, the "washed" surface of Sample 3 included 23.3% oxygen-containing functional groups, while the "washed" surface of Sample 2 was found to include only 18.9% oxygen-containing functional groups.

Finally, Samples 2 and 3 were re-analyzed 7 days after the surfaces were washed to determine whether any changes in the surface composition had occurred. These results are listed in the table as "7 day age" data. The results show that Sample 3, which was prepared according to the present invention, retained a significantly larger percentage of its polar surface groups over time than did Sample 2, which was prepared as a comparative example.

| Sample # | Description | Compositional Data from XPS Analysis | | |
|---|---|---|---|---|
| | | C—H, C—C | C—OH | C = O |
| 1 Comparative Example | unwashed | 100.0 | — | — |
| 2 Comparative Example | unwashed | 81.7 | 8.8 | 9.4 |
| | washed | 81.1 | 16.5 | 2.4 |
| | 7 day age | 90.9 | 5.7 | 3.5 |
| 3 | unwashed | 39.2 | 45.3 | 12.1 |
| | washed | 76.7 | 14.5 | 8.8 |
| | 7 day age | 77.0 | 14.9 | 8.1 |

In view of the disclosure, many modifications of this invention will be apparent to those skilled in the art. It is intended that all such modifications which fall within the true scope of this invention be included within the terms of the appended claims.

What is claimed is:

1. A method of manufacturing a painted plastic article, comprising the steps of:

activating one or more portions of a surface of a plastic substrate;

applying a solution containing an organic film-forming substance onto said substrate, said solution coating only the activated portions of said substrate surface;

drying said solution to form a temporary protective film on the activated portions of said surface, thereby rendering the activated portions less susceptible to abrasion or disruption during handling;

removing said temporary protective film to re-expose the activated surface portions of said substrate; and painting the activated surface portions of said substrate.

2. The method of claim 1, wherein said activating step comprises exposing said substrate to a plasma.

3. The method of claim 1, wherein said film-forming substance is water-soluble and said temporary protective film is removed with water.

4. The method of claim 1, wherein said film-forming substance is a saccharide.

* * * * *